United States Patent [19]
Gower

[11] Patent Number: 5,357,379
[45] Date of Patent: Oct. 18, 1994

[54] READ/WRITE CIRCUIT WITH SWITCHABLE HEAD RESISTANCE FOR READ AND WRITE MODES

[75] Inventor: Richard L. Gower, San Jose, Calif.

[73] Assignee: Exar Corporation, San Jose, Calif.

[21] Appl. No.: 86,745

[22] Filed: Jul. 2, 1993

[51] Int. Cl.$^5$ .......................... G11B 5/09; G11B 15/12
[52] U.S. Cl. ......................................... 360/46; 360/62
[58] Field of Search ...................... 360/46, 61, 62, 66, 360/67, 68

[56] References Cited

U.S. PATENT DOCUMENTS 3,618,119  11/1971  Rodinguez ............................. 360/46

OTHER PUBLICATIONS

A Wide-Band CMOS Read Amplifier for Magnetic Data Storage Systems by T-W Pan and Asad A. Abidi, IEEE Journal of Solid-State Circuits, vol. 27, No. 6, Jun., 1992.

VTC, Inc. Data Sheet for VM7200H date not avail.
Silicon Systems data sheet for SSI 32R202R/202IR Mar. 1991.

Primary Examiner—Donald Hajec
Assistant Examiner—T. N. Forbus, Jr.
Attorney, Agent, or Firm—Townsend and Townsend Khourie and Crew

[57] ABSTRACT

A read/write circuit for a disk drive system with a two-terminal magnetic head, having an adjustable damping resistor across the magnetic head. A switch network connects across the magnetic head and controls a resistor network to obtain an optimum level of impedance across the magnetic head in both the read mode and the write mode. The circuit provides a lower and well-defined impedance across the magnetic head in the write mode for all operating voltages across the head. A clamp circuit operates to prevent the write current source from saturating to improve current switching speed in the write mode.

11 Claims, 4 Drawing Sheets

READ/WRITE CIRCUIT WITH SWITCHABLE HEAD RESISTANCE FOR READ AND WRITE MODES

BACKGROUND OF THE INVENTION

The present invention relates to hard disk drive circuits. More particularly, the present invention provides a high performance read/write circuit with an adjustable impedance across the disk drive magnetic head.

General purpose computers that require mass-storage capabilities utilize magnetic disks to store large amounts of data. Data are stored by magnetizing the disk surface in one of two possible orientations to indicate either a logic one or a logic zero. This is referred to as the "write" operation. To "read" the data, a sensor detects the changes in the orientation of magnetic domains on the disk and translates them into logic ones or zeros.

The read and write operations are performed by disk drive assemblies that include an inductive head floating a fraction of a micrometer above the disk surface on an aerodynamic "slider" bearing. When writing data, the head always carries a current Iw, which creates a magnetizing force large enough to saturate the magnetic medium. The disk drive circuit keeps Iw constant when a logic zero is written on the disk, and when writing a logic one the circuit reverses the polarity of the current to switch the orientation of the magnetization on the disk. When reading data, the inductive head senses these changes in the orientation of magnetic domains on the disk which produce a voltage pulse across the inductive head according to Faraday's law. The amplitude of a read voltage pulse lies between 0.1 and 2 mV. An amplifier connects across the head to amplify the read voltage for accurate detection.

General considerations dictating the design of a disk drive circuit include frequency response and noise in the read mode and settling time in the write mode. These differing considerations result in changing requirements for the disk drive circuit in the read mode as compared to the write mode. For example, in the read mode, the parallel combination of the input capacitance of the read amplifier and the inductance of the head form a second-order low-pass filter. The peak produced by series resonance in the passband of this filter requires a damping resistor in parallel with the amplifier inputs. The value of this damping resistor is designed to optimize the circuit frequency response given the values for the head inductance and total effective capacitance that includes the amplifier input capacitance as well as other parasitic capacitances.

In the write mode, however, the read amplifier is no longer active and instead the write driver (a current switching circuit) is coupled across the head. Therefore, the total capacitance across the head does not necessarily remain constant. Furthermore, in the write mode, the damping resistor directly affects the settling time characteristics of the circuit. Because the write driver cannot instantaneously change the current through the head, the head current will undergo a transient with some characteristic settling time determined by the LRC circuit composed of the head (L), total capacitance (C), and the damping resistance (R).

Generally, a smaller damping resistor is required in the write mode compared to the read mode. To optimize the circuit performance in each mode of operation, it is therefore desirable to be able to vary the value of the damping resistor.

In the past, disk drive circuits have been designed with a compromised fixed value for the damping resistor that meets the minimum requirements of each mode. However, this is clearly not a satisfactory solution. One suggested approach to variable damping resistance includes a fixed damping resistor that is present in both modes. A combination of two back-to-back Schotcky diodes in series with a smaller resistor is then connected in parallel with the fixed resistor. The diodes effectively remove the smaller resistor from the circuit during the read operation when the voltage induced across the head is in the millivolts range (i.e. too small to turn on the diodes). In the write mode, the higher voltage across the head turns on the diodes to couple the smaller resistor in parallel with the fixed damping resistor across the head. This reduces the effective resistance to provide the required damping for the write current waveform.

This approach, however, suffers from several drawbacks. The applicability of this design is limited to those disk drive circuits that present a differential voltage greater than the turn on voltage of the diodes (approximately 0.3 v) in the write mode. Furthermore, the required additional circuit elements (a second smaller resistor and Schotcky diodes) connected across the magnetic head may cause undesirable effects. For example, the diodes introduce parasitic capacitances to only one end of the head that also vary in value depending on whether the diodes are on or off.

Therefore, an object of the present invention is to provide a read/write circuit with an adjustable damping resistor that is optimized for both read and write modes of operation. Another object of the present invention is to provide a read/write circuit with a much lower and well defined impedance across the head for all voltages in the write mode.

SUMMARY OF THE INVENTION

The read/write circuit of the present invention provides for an adjustable impedance across a two-terminal magnetic head of a disk drive system, while maintaining minimum connections to the head terminals. The read/write circuit of the present invention includes two terminals for coupling to a magnetic head, a current switching circuit to perform the write operation, a plurality of resistors connected in series and across the magnetic head terminals, and a switch network that connects to the plurality of resistors to adjust the resistance across the magnetic head depending on the mode of operation. The switch network operates such that the resistance across the magnetic head is reduced in the write mode as compared to the read mode. The value of the effective resistance present across the magnetic head is adjusted to provide optimum damping effect in each mode of operation.

The read/write circuit of the present invention provides write current switching through the magnetic head at higher speeds. In a preferred embodiment, bipolar devices are used to implement the current switching circuit. To increase the switching speed of the write current through the magnetic head, the present invention provides a clamping structure that prevents the bipolar devices from entering a saturation region. When not saturated, the bipolar devices are able to turn off significantly faster.

The present invention, therefore, provides a read/write circuit for a magnetic disk drive system that features an adjustable damping resistor across a two-terminal magnetic head, as well as fast current switching speed in the write mode, with minimum connections to the magnetic head terminals. The topology of the read/write circuit of the present invention also provides for an improved method of detecting an "open" magnetic head.

A further understanding of the read/write circuit of the present invention may be had with reference to the description and diagrams below.

DESCRIPTION OF THE PREFERRED EMBODIMENT

Figure 1:
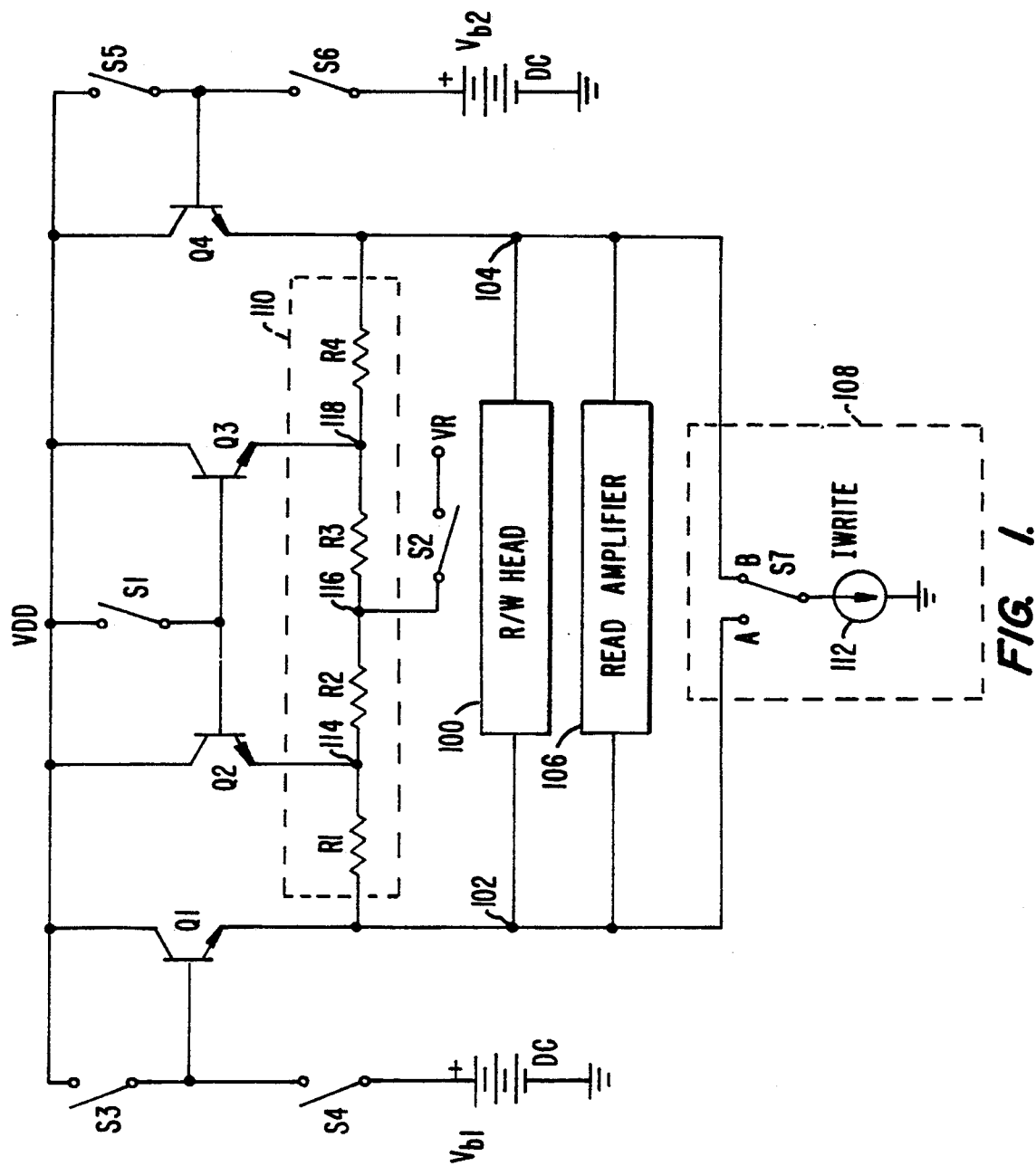
FIG. 1 is a simplified circuit diagram of the read/write circuit of the present invention.

FIG. 1 is a simplified circuit diagram of the read/write circuit of the present invention. The circuit includes a two terminal magnetic read/write head (R/W head) 100, with a first terminal 102 and a second terminal 104. A read amplifier 106 connects across R/W head 100. A write current switching circuit 108, and a resistor block 110 also connect across R/W head 100. Current switching circuit 108 includes a write current source 112 and a switch S7. Resistor block 110 includes four resistors R1, R2, R3 and R3 connected in series with one end (R1) connecting to head terminal 102 and the other end (R4) connecting to head terminal 104. Resistors R1 and R4 are of equal value and so are resistors R2 and R3. The remaining part of the circuit forms a switch network that includes three bias voltages Vb1, Vb2 and Vr, switches S1, S2, S3, S4, S5 and S6, and bipolar transistors Q1, Q2, Q3 and Q4 interconnecting to resistor block 110 as shown in FIG. 1.

In the read mode, switch S2 closes to connect node 116 of resistors R2 and R3 to a read bias voltage Vr. All other switches are open and the write current in current source 108 is set to zero. With all switches open (except for S2), the base terminals of bipolar transistors Q1, Q2, Q3 and Q4 will be floating, turning off all four transistors. The total impedance across R/W head 100 will be equal to the sum of the four resistors R1, R2, R3 and R4 in parallel with read amplifier 106 input impedance. Since the value of R1 is equal to R4 and the value of R2 is equal to R3, the total impedance in the read mode can be expressed as $2\times(R1+R2)$ in parallel with read amplifier 106 input impedance. The read bias voltage Vr will bias the input of read amplifier 106 into it's linear range.

In the write mode, switch S1 is closed and switch S2 is open. Depending on the write data, switch S7 toggles between positions A and B that are connected to R/W head 100 terminals 102 and 104, respectively. When S7 is in the A position (i.e. connected to terminal 102), S4 and S5 close while S3 and S6 open. In this case, three bipolar transistors Q2, Q3 and Q4 form diodes connecting the power supply (Vdd) to nodes 114, 118, and 104, respectively. Therefore, all these three nodes are at the same potential with no current flowing through resistors R2, R3 and R4. The write current, Iw, generated by current source 112, flows through R/W head 100 from terminal 104 to terminal 102, via transistor Q4. Due to the inherent resistivity of R/W head 100, there will be a voltage drop across R/W head 100. As a result, a certain amount of current flows through resistor R1 to reflect the same voltage drop across the resistor block 110. Therefore, the total impedance across R/W head 100 is equal to R1 in this mode.

To write a logic one, the direction of current flow in R/W head 100 is switched by changing the position of switch S7. When switch S7 moves from position A to position B (i.e. connecting to terminal 104), several events take place. Switches S4 and S5 open, and switches S3 and S6 close. Due to the inductive characteristics of R/W head 100, the direction of current flow in head 100 can not change instantaneously. As a result, immediately upon switching, terminal 104 is pulled low by current source 112, and terminal 102 "kicks" high. Terminal 104 thus becomes a low impedance node. To prevent current source 112 from saturating during this short time period, bias voltage Vb2 at the base of transistor Q4 operates to prevent the voltage at terminal 104 to fall below a minimum level. Staying out of saturation allows write current switching circuit 108 to switch current flow at higher speeds. This will be further explained in connection with FIG. 2.

During the short transient period immediately after switch S7 changes position, transistors Q1 and Q2 turn off due to the inductive "kick" at terminal 102. During this same period, terminal 104 is a low impedance node, effectively removing the resistance associated with resistor R4 connected at that node. Therefore, the total impedance across R/W head 100 in this transient mode equals $(R1+R2+R3)$, or $(R1+2\times R2)$ in value.

As the current in R/W head 100 finally reverses direction, transistor Q1 turns on and transistor Q4 turns off. This time the total impedance across R/W head 100 is equal to R4 (equal to R1 in value). A similar transient will occur when switch S7 changes position from terminal 104 to terminal 102.

Figure 2:
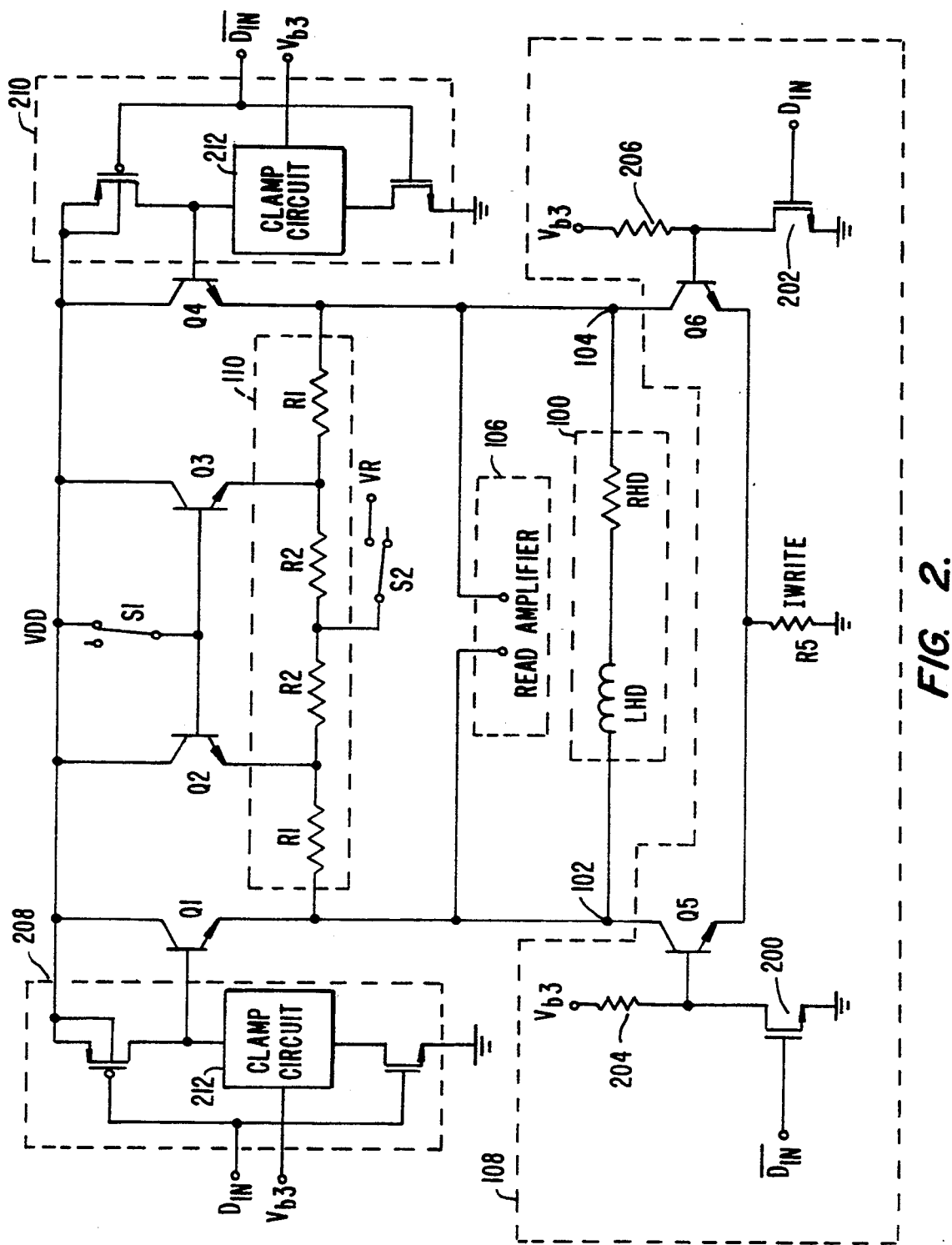
FIG. 2 is a circuit diagram of the preferred embodiment of the read/write circuit of the present invention.

FIG. 2 is a more detailed circuit schematic of the present invention illustrating the operation of the circuit in response to write input data. The circuit includes R/W head 100, read amplifier 106 and resistor block 110 interconnected as in FIG. 1. Write current switching circuit 108 of FIG. 1 is implemented using an emitter-coupled pair of bipolar transistors Q5 and Q6, having their emitters connected to a ground terminal through a resistor R5. Collector terminals of transistors Q5 and Q6 connect to two R/W head 100 terminals 102 and 104, respectively. An NMOS transistor 200 receives an inverse of the write input data $\overline{Din}$ at its gate terminal. A bias voltage Vb3 and a resistor 204 provide biasing for NMOS 200. An output of NMOS 200 connects to a base terminal of bipolar transistor Q5. A similar structure including NMOS 202, resistor 206 and bias voltage Vb3 drive a base terminal of Q6. A gate of NMOS 202 connects to write data input Din.

A switch network includes transistors Q1, Q2, Q3 and Q4, and switches S1 and S2 connected as in FIG. 1. Switches S3, S4, S5 and S6 have been replace by two inverters 208 and 210. Each inverter includes a pull-up PMOS device and a pull-down NMOS device. Clamp circuit 212 connects the pull-down NMOS device of inverters 208 and 210 to their outputs, respectively.

Inverter 208 has an input connecting to Din, and an output connecting to a base terminal of Q1. Inverter 210 has an input connecting to $\overline{\text{Din}}$, and an output connecting to a base terminal of Q4.

In the read mode, current switching circuit 108 is disabled by connecting bias voltage Vb3 to ground. Switch S1 is open, switch S2 closed, and both Din and $\overline{\text{Din}}$ are pulled high. This arrangement turns off all bipolar transistors Q1, Q2, Q3, Q4, Q5 and Q6. Similar to FIG. 1, with Vr biasing amplifier 106, the total impedance across R/W head 100 in the read mode equals $2\times(R1+R2)$ in parallel with amplifier 106 input impedance.

In the write mode, switch S2 is open and switch S1 is closed to turn on transistors Q2 and Q3. Bias voltage Vb3 is set at a predetermined voltage level to allow transistors Q5 and Q6 to carry a fixed amount of current Iw. When Din is high (i.e. logic "1"), inverter 210 pulls the base of transistor Q4 up to Vdd, turning on Q4. At the same time transistor Q5 turns on while transistor 202 causes Q6 to turn off. The current Iw that is set by bias voltage Vb3 and resistors 204 and R5, flows through Q4 and Q5 via R/W head 100 from terminal 104 to terminal 102. Due to the R/W head 100 resistance some current will flow through Q2 and R1. The total impedance present across R/W head 100 in this mode is thus equal to R1.

As described above, to write a logic one, the direction of current flow in the R/W head 100 must be reversed. This is accomplished by toggling the write input data Din, which corresponds to changing the position of switch 7 in FIG. 1. As the write input data Din changes from a logic one to a logic zero, transistor Q6 turns on and transistor Q5 turns off. Although the voltage at the base of Q1 is pulled high by inverter 208, Q1 does not initially turn on due to the increased voltage at terminal 102 caused by the inductive "kick" described above. As described in connection with FIG. 1, the direction of current flow in inductive head 100 can not change instantaneously. The voltage at terminal 104 drops rapidly, turning terminal 104 into a low impedance node. This results in a total impedance across R/W head 100 during this initial transient period of $(R1+R2+R3=R1+2\times R2)$.

Figure 3:
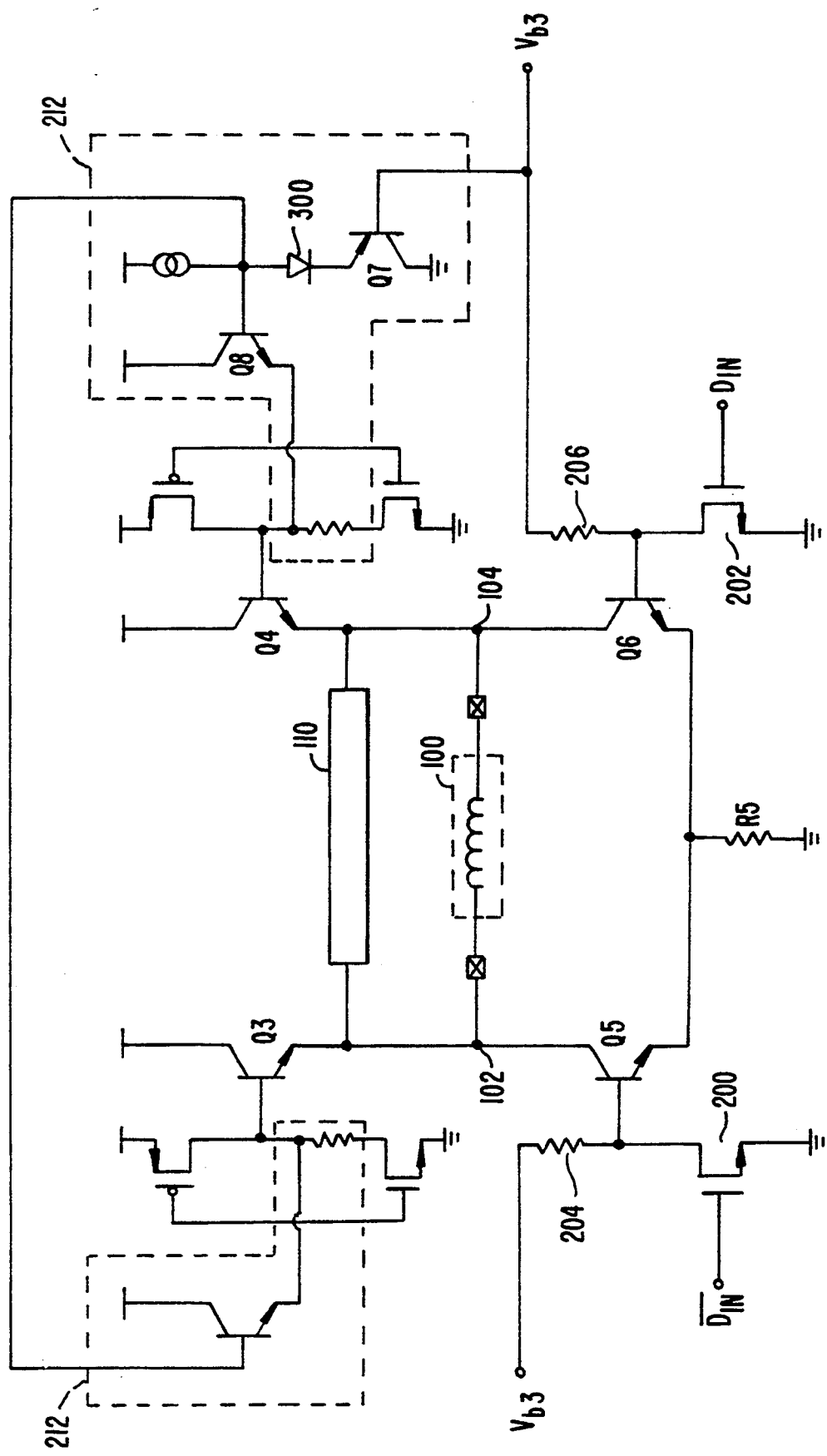
FIG. 3 is a diagram of the clamping circuit for a switch network of the read/write circuit of the present invention.

The operation of the clamp circuit 212 will now be described. With transistor Q6 turned on, the voltage drop at terminal 104 can cause bipolar transistor Q6 to enter saturation region. Because a saturated Q6 would switch at a much lower speed, clamp circuit 212 operates to prevent transistor Q6 from saturating. FIG. 3 is a portion of the read/write circuit of the present invention showing one example of a circuit schematic for clamp circuit 212. To prevent Q6 from entering saturation region, its base-collector voltage Vbc must be kept below a diode turn-on voltage. That is, the voltage at terminal 104 must not go lower than the voltage at the base of Q6 by one diode drop. This is ensured by the circuit shown in FIG. 3. When Din cuts off transistor 202, the base of Q6 pulls up to bias voltage Vb3 (neglecting Q6's base current through resistor 206). Bias voltage Vb3 also connects to clamp circuit 212 at the base of a PNP transistor Q7. Starting at the base of Q7, the voltage path Vb3 goes through in clamp circuit 212 includes $+$Vbe of Q7, $+$Von of diode 300, $-$Vbe of Q8, and $-$Vbe of Q4 before arriving at terminal 104 at the emitter terminal of Q4. Since the added voltages (2Vbe) cancel out the subtracted voltages (2Vbe), approximately the same voltage (Vb3) appears at the collector of Q6 (i.e. at terminal 104) as is applied at its base. Thus, the base-collector junction of Q6 will never be forward biased. This prevents Q6 from entering saturation region and enables it to turn off much faster when Din goes high.

After the initial transient period, and as the current in R/W head 100 finally reverses direction, transistor Q1 turns on and transistor Q4 turns off. As described in connection with FIG. 1, this time the total impedance across R/W head 100 is R4 (equal to R1 in value). A similar transient will occur when write data Din changes from a logic zero to a logic one. Therefore, the read/write circuit of the present invention provides a resistance equal to $2\times(R1+R2)$ across magnetic head 100 in the read mode, and a smaller resistance equal to R1 across head 100 in the write mode.

The circuit topology of the present invention as depicted in FIG. 1, also provides for an improved method of detecting an "open" magnetic head. To prevent attempts to write onto the disc when the magnetic head has opened, read/write circuits must be able to detect when the head has opened. Read/write circuits, typically use the properties of the head itself to detect the open head condition. As described in connection with the operation of the circuit in FIG. 1, the inductive property of the head causes a "kickback" when the current is switched through the head. This kickback causes the voltage on one side of the magnetic head to rise above the nominal operating value. This pulse would not be present if the head was opened. By detecting the presence of this pulse during each half of the write cycle, a write unsafe circuit can determine if the head is in normal operation or has opened.

This method of detection, however, is not totally reliable. This is due to the fact that the size of the pulse caused by the kickback depends on the inductance of the head, the total capacitance across the head and the current through the head. Because all of these are variable, the pulse generated varies both in width and amplitude.

Figure 4:
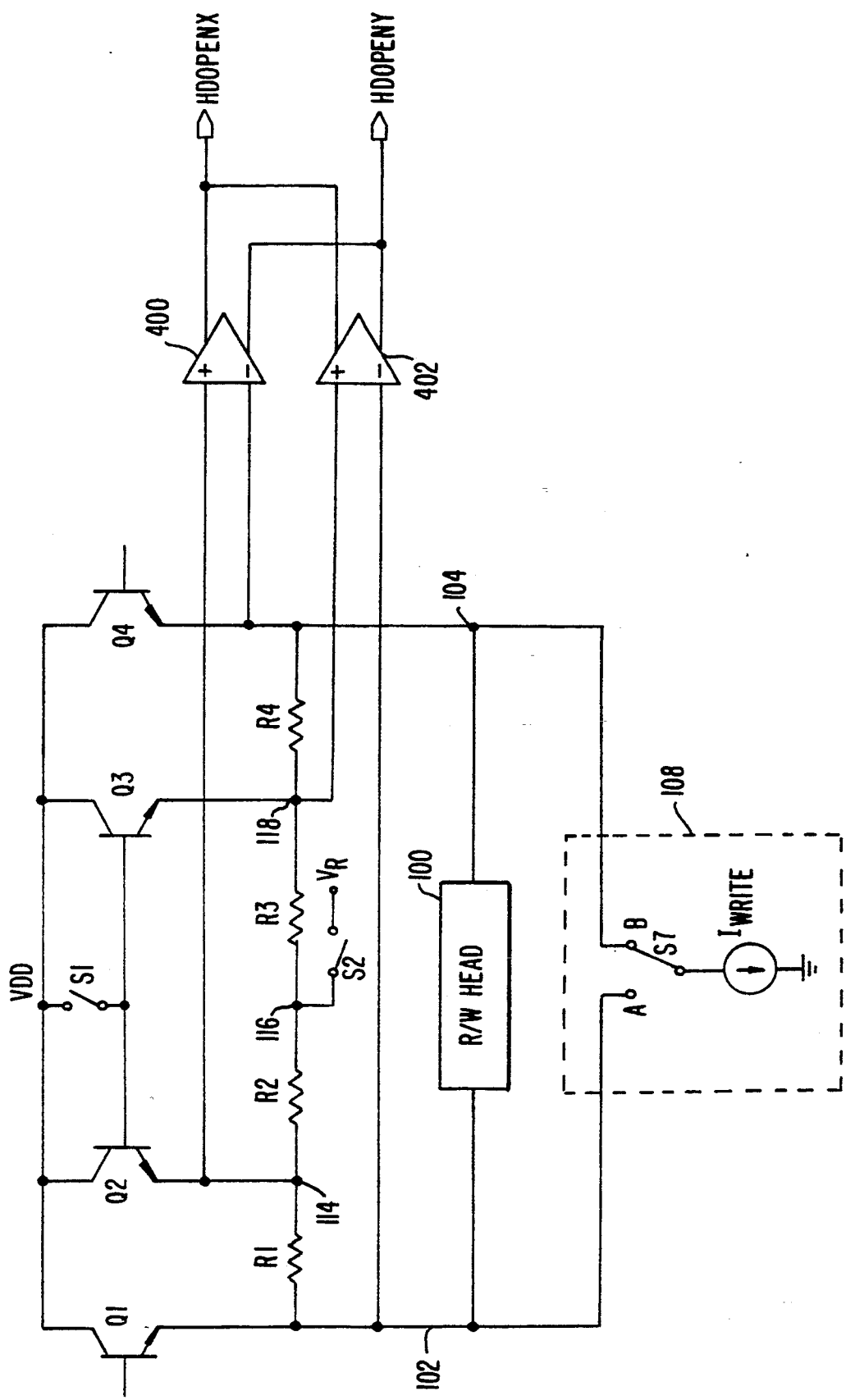
FIG. 4 is a circuit diagram of a part of the read/write circuit of the present invention showing an open head detection circuit.

The read/write circuit of the present invention provides for a consistent and reliable method of detecting an open head. The improved method is based on detecting the voltage drop across transistors Q1 through Q4 of FIG. 1. FIG. 4 shows a portion of the circuit of FIG. 1 and the detection circuit. A comparator 400 has two inputs connecting to the emitters of bipolar transistors Q2 and Q4 respectively. A second comparator 402 has two inputs connecting to the emitters of transistors Q1 and Q3 respectively. Therefore, comparator 400 senses the voltage difference between Q2 and Q4, while comparator 402 senses the voltage difference between Q1 and Q3. Only one comparator is actively sensing at a time, depending on the state of current switching circuit 108.

Referring to FIG. 4, the current switch S7 is shown in the B position. Comparator 402, connected to Q1 and Q3, is therefore active. In normal operation, a majority of the write current will flow through the head 100 and the emitter terminal of Q1. Only a small portion of the current will flow through R4 and Q3 emitter. This will cause the voltage at node 102 to be lower than that of node 118. If the head 100 is open, a majority of the write current will flow through R4, Q3 and Q4. Since no current can flow through Q1, the voltage at node 102 will rise as compared to node 118. This voltage difference between nodes 102 and 118 is detected by comparator 402. Comparator 400 is active, sensing the voltage difference between nodes 104 and 114, when the current switch S7 is in position A. The true and complement outputs of comparator 400 are connected to the corresponding outputs of comparator 402, and both feed into a write unsafe detector circuitry. Therefore, with the addition of two simple comparators, the read/write circuit of the present invention provides for a consistent and reliable method of detecting an open head condition.

In conclusion, the present invention offers a read/write circuit with an adjustable impedance across a two-terminal magnetic head of a disk drive system, while maintaining minimum connections to the head terminals. While the above is a complete description of the preferred embodiment of the present invention, it is possible to use various alternatives, modifications and equivalents. For example, the relative values of the resistors as well as their interconnection may vary. Also, MOS transistors instead of bipolar transistors may be utilized to implement the circuit without departing from the inventive concept. Therefore, the scope of the present invention should be determined not with reference to the above description but should, instead, be determined with reference to the appended claims, along with their full scope of equivalents.

What is claimed is:

1. A read/write circuit for a magnetic data storage system, comprising:
   a first and a second head terminal for coupling to a two-terminal magnetic head, said magnetic head performing a read operation in a read mode and a write operation in a(write mode;
   current switching means, coupled across said first and second head terminals, for switching a direction of current through said magnetic head in said write mode;
   a plurality of resistors switchably coupled across said first and second head terminals; and
   resistor switching means coupled to said plurality of resistors, for coupling a first number of said plurality of resistors across said first and second head terminals in said read mode, and coupling a second number of said plurality of resistors across said first and second head terminals in said write mode.

2. The read/write circuit of claim 1 wherein said second number of said plurality of resistors in said write mode is less than said first number of said plurality of resistors in said read mode.

3. The read/write circuit of claim 1 wherein said plurality of resistors comprise:
   a first resistor having a first terminal coupled to said first head terminal, and a second terminal;
   a second resistor having a first terminal coupled to said first resistor second terminal, and a second terminal;
   a third resistor having a first terminal coupled to said second resistor second terminal, and a second terminal; and
   a fourth resistor having a first terminal coupled to said third resistor second terminal, and a second terminal coupled to said second head terminal.

4. The read/write circuit of claim 3 wherein said switch network comprises:
   a first transistor having a first terminal coupled to a power supply terminal, a second terminal coupled to said first head terminal, and an input terminal;
   a second transistor having a first terminal coupled to said power supply terminal, a second terminal coupled to said first resistor second terminal, and an input terminal;
   a third transistor having a first terminal coupled to said power supply terminal, a second terminal coupled to said fourth resistor first terminal, and an input terminal couple to said second transistor input terminal;
   a fourth transistor having a first terminal coupled to said power supply terminal, a second terminal coupled to said second head terminal, and an input terminal;
   a first single switch coupling said second and third transistor input terminals to said power supply; and
   a second single switch coupling said second resistor second terminal to a read bias voltage.

5. The read/write circuit of claim 4 wherein said switch network further comprises:
   a first pair of switches coupling said first transistor input terminal to one of said power supply terminal or a first bias voltage, respectively; and
   a second pair of switches coupling said fourth transistor input terminal to one of said power supply or a second bias voltage, respectively.

6. The read/write circuit of claim 4 wherein said switch network further comprises:
   a first inverter having an input coupled to a write input data and an output coupled to said first transistor input terminal; and
   a second inverter having an input coupled to an inverse of said write input data and an output coupled to said fourth transistor input terminal.

7. The read/write circuit of claim 4 further comprising:
   a first comparator having a first input coupled to said first transistor second terminal, a second input coupled to said third transistor second terminal, and at least one output; and
   a second comparator having a first input coupled to said second transistor second terminal, a second input coupled to said fourth transistor second terminal, and at least one output,
   wherein a voltage level at said output of said first comparator and said output of said second comparator indicate when said two-terminal magnetic head is opened.

8. A read/write circuit for a magnetic storage system, comprising:
   a first and a second head terminal for coupling to a two-terminal magnetic head, said magnetic head performing a read operation in a read mode and a write operation in a write mode;
   current switching means, coupled across said first and second head terminals, for switching a direction of current through said magnetic head in a write mode;
   a plurality of resistors switchably coupled across said first and second head terminals;
   a switch network coupled to said plurality of resistors;
   a first resistor having a first terminal coupled to said first head terminal, and a second terminal;
   a second resistor having a first terminal coupled to said first resistor second terminal, and a second terminal;
   a third resistor having a first terminal coupled to said second resistor second terminal, and a second terminal;

a fourth resistor having a first terminal coupled to said third resistor second terminal, and a second terminal coupled to said second head terminal;

a first transistor having a first terminal coupled to a power supply terminal, a second terminal coupled to said first head terminal, and an input terminal;

a second transistor having a first terminal coupled to said power supply terminal, a second terminal coupled to said first resistor second terminal, and an input terminal;

a third transistor having a first terminal coupled to said power supply terminal, a second terminal coupled to said fourth resistor first terminal, and an input terminal couple to said second transistor input terminal;

a fourth transistor having a first terminal coupled to said power supply terminal, a second terminal coupled to said second head terminal, and an input terminal;

a first pair of switches coupling said first transistor input terminal to one of said power supply terminal or a first bias voltage, respectively;

a second pair of switches coupling said fourth transistor input terminal to one of said power supply or a second bias voltage, respectively;

a first single switch coupling said second and third transistor input terminals to said power supply; and a second single switch coupling said second resistor second terminal to a read bias voltage.

9. The read/write circuit of claim 1 wherein said current switching means further comprises:
a first input transistor receiving a write input data at an input terminal;
a second input transistor receiving an inverse of said write input data at an input terminal; and
a pair of switch transistors each having a first terminal commonly coupled to a write current resistor, a second terminal coupled to said first and second head terminal respectively, and an input terminal coupled to an output of said first input transistor and an output of said second input transistor, respectively.

10. The read/write circuit of claim 9 further comprising a clamping circuit coupled to said first and second inverters to ensure fast switching of said pair of switching transistors.

11. A read/write circuit for a magnetic data storage system comprising:
a first and a second head terminal for coupling to a two-terminal magnetic head, said magnetic head performing a read operation in a read mode and a write operation in a write mode;
a plurality of resistors switchably coupled across said first and second head terminals, including:

a first resistor having a first terminal coupled to said first head terminal, and a second terminal, a second resistor having a first terminal coupled to said first resistor second terminal, and a second terminal, a third resistor having a first terminal coupled to said second resistor second terminal, and a second terminal, and a fourth resistor having a first terminal coupled to said third resistor second terminal, and a second terminal coupled to said second head terminal;

a switch network coupled to said plurality of resistors and across said first and second head terminals, including:

a first transistor having a first terminal coupled to a power supply terminal, a second terminal coupled to said first head terminal, and an input terminal, a second transistor having a first terminal coupled to said power supply terminal, a second terminal coupled to said first resistor second terminal, and an input terminal, a third transistor having a first terminal coupled to said power supply terminal, a second terminal coupled to said fourth resistor first terminal, and an input terminal couple to said second transistor input terminal, a fourth transistor having a first terminal coupled to said power supply terminal, a second terminal coupled to said second head terminal, and an input terminal, a first inverter having an input coupled to a write input data and an output coupled to said first transistor input terminal, a second inverter coupled to an inverse of said write input data and an output coupled to said fourth transistor input terminal, a first switch coupling said second and third transistor input terminals to said power supply, and a second switch coupling said second resistor second terminal to a read bias voltage;

current switching means, coupled across said first and second head terminals, for switching a direction of current through said magnetic head in a write mode, said current switching means including:

a first input transistor receiving said inverse of said write input data at an input terminal, a second input transistor receiving said write input data at an input terminal, and a pair of switch transistors each having a first terminal commonly coupled to a write current resistor, a second terminal coupled to said first and second head terminal respectively, and an input terminal coupled to an output of said first input transistor and an output of said second input transistor, respectively.

* * * * *